(12) United States Patent
Grosch et al.

(10) Patent No.: US 9,927,791 B2
(45) Date of Patent: Mar. 27, 2018

(54) METHOD FOR REPRODUCING THE SEQUENCE OF A PROGRAM IN AN AUTOMATION DEVICE

(71) Applicant: Siemens Aktiengesellschaft, Munich (DE)

(72) Inventors: Thomas Grosch, Roβtal (DE); Jürgen Laforsch, Bühl (DE); Albert Renschler, Ettlingen (DE)

(73) Assignee: Siemens Aktiengesellschaft, Munich (DE)

( * ) Notice: Subject to any disclaimer, the term of this patent is extended or adjusted under 35 U.S.C. 154(b) by 398 days.

(21) Appl. No.: 14/519,530

(22) Filed: Oct. 21, 2014

(65) Prior Publication Data

US 2015/0120013 A1 Apr. 30, 2015

(30) Foreign Application Priority Data

Oct. 25, 2013 (EP) .................... 13190307

(51) Int. Cl.
*G05B 19/42* (2006.01)
*G05B 19/05* (2006.01)
(Continued)

(52) U.S. Cl.
CPC ............ *G05B 19/056* (2013.01); *G06F 11/14* (2013.01); *G06F 11/3476* (2013.01);
(Continued)

(58) Field of Classification Search
CPC ........ G05B 19/056; G05B 2219/13152; G06F 11/3476; G06F 11/3636; G06F 11/366; G06F 11/14; G06F 11/3664
(Continued)

(56) References Cited

U.S. PATENT DOCUMENTS

| 2001/0003517 | A1 | 6/2001 | Nonaka et al. |
| 2002/0087950 | A1* | 7/2002 | Brodeur .............. G06F 11/3636 717/124 |

(Continued)

FOREIGN PATENT DOCUMENTS

| CN | 1302063 | 7/2001 |
| CN | 1619681 | 5/2005 |
| CN | 101111895 | 1/2008 |

OTHER PUBLICATIONS

A Taxonomy of Execution Replay Systems, Cornelis et al, International Conference on Advances in Infrastructure Forelectronic Business, Education, Science, Medicine and Mobiletechnologies on the Internet; 2003; Jan. 1, 2003.
Office Action dated Nov. 28, 2016 which issued in the corresponding Chinese Patent Application No. 201410575544.0.

*Primary Examiner* — Ziaul Karim
(74) *Attorney, Agent, or Firm* — Cozen O'Connor

(57) ABSTRACT

A method for reproducing the sequence of a program provided for process control in an automation device, wherein a program that corresponds to the program in the automation device with regard to process control is provided for processing using a backup device, where suitable measures can be used to image the complete history of the automation device and to reproduce the sequence of the program so that with regard to the processing of the program, it becomes possible to subsequently and repeatedly approach any desired time in the past and to reproduce all associated data.

18 Claims, 3 Drawing Sheets

(51) Int. Cl.
*G06F 11/36* (2006.01)
*G06F 11/14* (2006.01)
*G06F 11/34* (2006.01)

(52) U.S. Cl.
CPC ........ *G06F 11/366* (2013.01); *G06F 11/3636* (2013.01); *G06F 11/3664* (2013.01); *G05B 2219/13152* (2013.01)

(58) Field of Classification Search
USPC .................................. 700/86; 717/124, 125
See application file for complete search history.

(56) References Cited

U.S. PATENT DOCUMENTS

| | | | |
|---|---|---|---|
| 2003/0214953 A1* | 11/2003 | El-Demerdash | H04L 12/403 370/400 |
| 2004/0139294 A1* | 7/2004 | Colvig | G06F 11/1464 711/162 |
| 2005/0020279 A1* | 1/2005 | Markhovsky | G01S 5/0294 455/456.1 |
| 2005/0044278 A1* | 2/2005 | Goodman | G06F 8/67 710/1 |
| 2005/0105430 A1 | 5/2005 | Takashima | |
| 2009/0279867 A1 | 11/2009 | Hamada et al. | |
| 2010/0249956 A1* | 9/2010 | Bliss | G05B 19/056 700/47 |
| 2013/0036403 A1 | 2/2013 | Geist | |

* cited by examiner

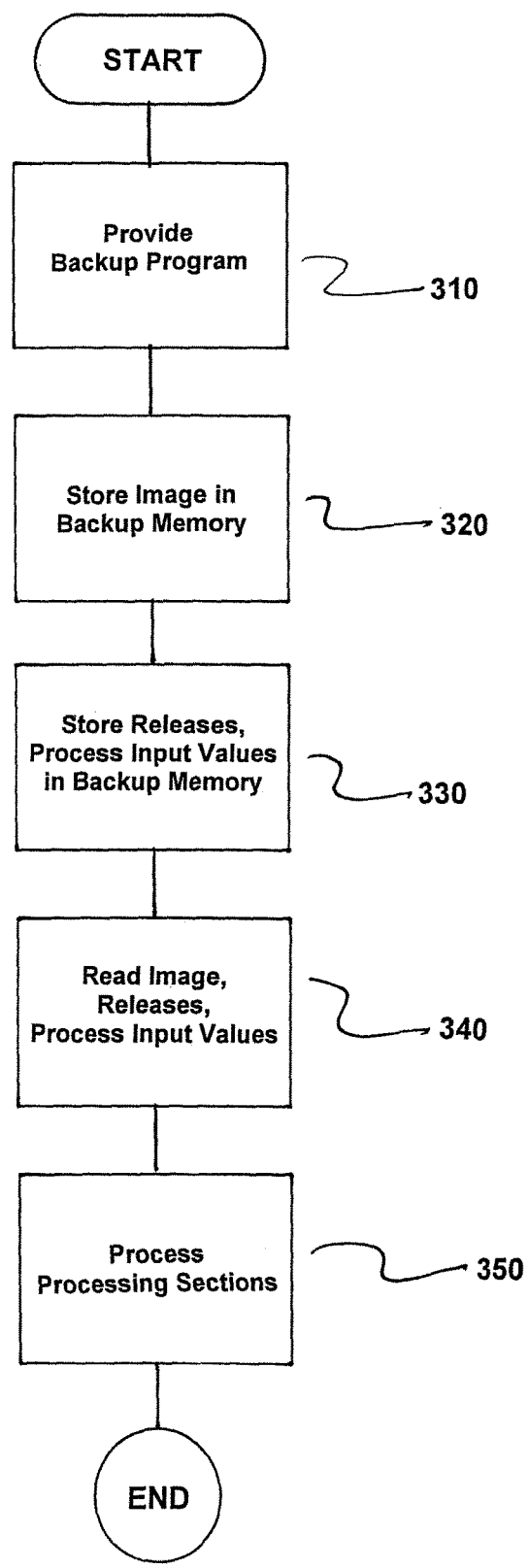

METHOD FOR REPRODUCING THE SEQUENCE OF A PROGRAM IN AN AUTOMATION DEVICE

BACKGROUND OF THE INVENTION

1. Field of the Invention

The invention relates to an arrangement having an automation device, a backup device and a method for reproducing the sequence of a program provided for process control in an automation device.

2. Description of the Related Art

In the automation environment, there is often a desire to be able to largely understand the behavior of an automation device and subsequently evaluate data and the changes the automation device. For example, a user would like to test a control program created for an automation device and would like to quickly and reliably find errors that occurred during process control, in particular also errors that occurred sporadically or even only once. It is also an aim of a manufacturer or supplier of automation devices to quickly detect and eliminate errors in the firmware of the automation devices or in a system program provided for the devices. It may also be necessary to demonstrate to a user that neither the firmware nor a system program is the cause of an error that has occurred but, rather, a defective or erroneously created user or control program. In order to investigate such errors or such a behavior, trace mechanisms are provided but the these cannot be used to record all variables and the changes in the variables.

The situation may also occur in which an installation operator must subsequently verify the quality of a product produced months or years ago, for example. The operator will usually archive selected production data, for such as by using an operating and observation system. However, the archived data are not sufficient, under certain circumstances, to assess the product quality in the specific individual case. Complete comprehensibility cannot be achieved using known archiving means or measures.

SUMMARY OF THE INVENTION

It is therefore an object of the invention to provide an arrangement having au automation device, a backup device and a method of which can be used to reproduce the sequence of a program or control program provided for process control in an automation device.

These and other objects and advantages are achieved in accordance with the invention by a method and arrangement by which a state of the automation device which has occurred at any desired times in the past can be advantageously completely reproduced and visualized. It is possible to record all sequences of the automation device on the backup device, such as a remote server. This recording reproduces the complete history of the automation device, such as the history of a customer programmable logic controller (PLC). With respect to the program sequence on the backup device, this makes it possible to subsequently and repeatedly approach any desired time in the past and read all associated data.

At a predetermined time, the automation device creates an image of its relevant data representing the internal state of the automation device at this time, these data being stored in a backup memory. This backup memory may be in the form of an independent device or may be part of the backup device, such as a backup PLC, a "shadow PLC" or a backup server. This internal state is substantially determined or predefined by static and dynamic data, data modules, process input values, process output values and configuration data. During process control, i.e., during the processing of its control program for controlling a technical process or an installation to be controlled, the automation device also stores releases and process input values in the backup memory, the releases indicating which processing sections of the control program have already been processed by the automation device.

In order to reproduce the sequence of the (control) program in the automation device, the backup device reads the image as well as the releases and the process input values from the backup memory. On account of the fact that the backup program corresponds to the program in the automation device with regard to the process control functionality, the backup device is able to use the image, the releases and the process input values to run through the same program paths of its backup program which have already been run through by the program in the automation device in the past.

It is pointed out that a program is understood as meaning both a program as such and a subroutine, a part of a program, a task, a thread, an organizational module, a functional module or another suitable program code for implementing an automation function, the programs of an automation device usually being categorized into priority classes and being processed or executed according to their associated priority.

In an embodiment of the invention, the backup device processes the backup program during the processing of the program in the automation device (referred to as the automation device program below), which means that the trailing is very minor and the backup program can "keep up with" the processing of the automation device program and the backup program runs occur in a temporally asynchronous manner with the automation device program runs. The sequence of the processing sections of the automation device program that have already been processed, which sequence is to be reproduced or reconstructed, can be quickly achieved. Different user groups, such as programmers, service engineers, installation operators, or manufacturers, are therefore able to completely understand sequences, states and/or data of the automation device program to be able to analyze and document, in particular, sporadic or one-off occurrences in the past.

In accordance with another embodiment of the invention, the backup device processes its backup program after the processing of the automation device program. For example, the backup program is run through only after days, weeks, months or even years as required. In this case, the different user groups are also able to completely understand sequences, states and/or data of the automation device program in order to be able to analyze and document, in particular, sporadic or one-off occurrences in the past.

The situation may occur in which an automation device program controls a technical process over a very long period of time (months, years), as a result of which the amount of data in the backup memory is very large. In order to be able to quickly "fast-forward or rewind" in the backup program, provision is therefore made for an initial image to be produced at a first time and for intermediate images to be produced at further times and to be stored in the backup memory. These further intermediate images represent further internal states of the backup device at these times that correspond to the internal states of the automation device. If, for example, an intermediate image is produced at a further time tx and is stored, the sequence of the backup program can be reproduced from a time tx+td by "rewinding or fast-forwarding" the backup program to the time tx and starting the processing of the backup program from the time tx. Therefore, the backup program does not need to start beginning with the initial image but rather only with the intermediate image, thus shortening the sequence to be reproduced or reconstructed.

Such further intermediate images can be created both by the backup device and by the automation device and can be stored in the backup memory. In both cases, it is possible to quickly "fast-forward and rewind" in the backup program and therefore to reproduce the automation device program sequence. However, in the last-mentioned case, the automation device is additionally burdened during process control.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention, its refinements and advantages are explained in more detail below using the drawings which illustrate an exemplary embodiment of the invention, in which:

FIG. 3 is a flowchart of the method in accordance with the invention.

DETAILED DESCRIPTION OF THE PRESENTLY EMBODIMENTS

Figure 1:
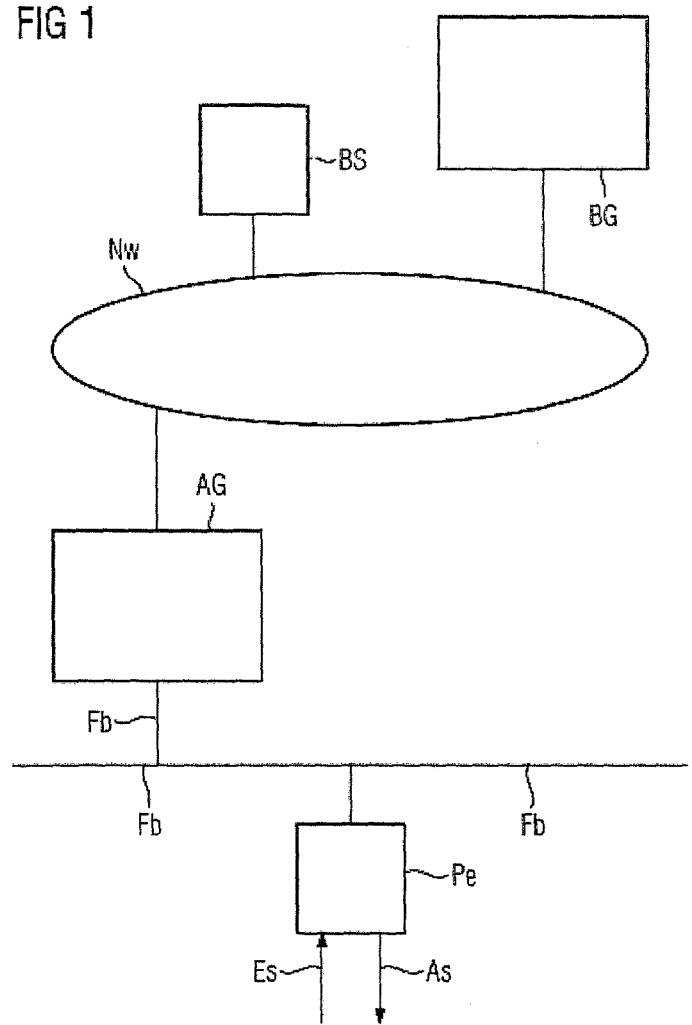
FIG. 1 shows an automation system.
Figure 2:
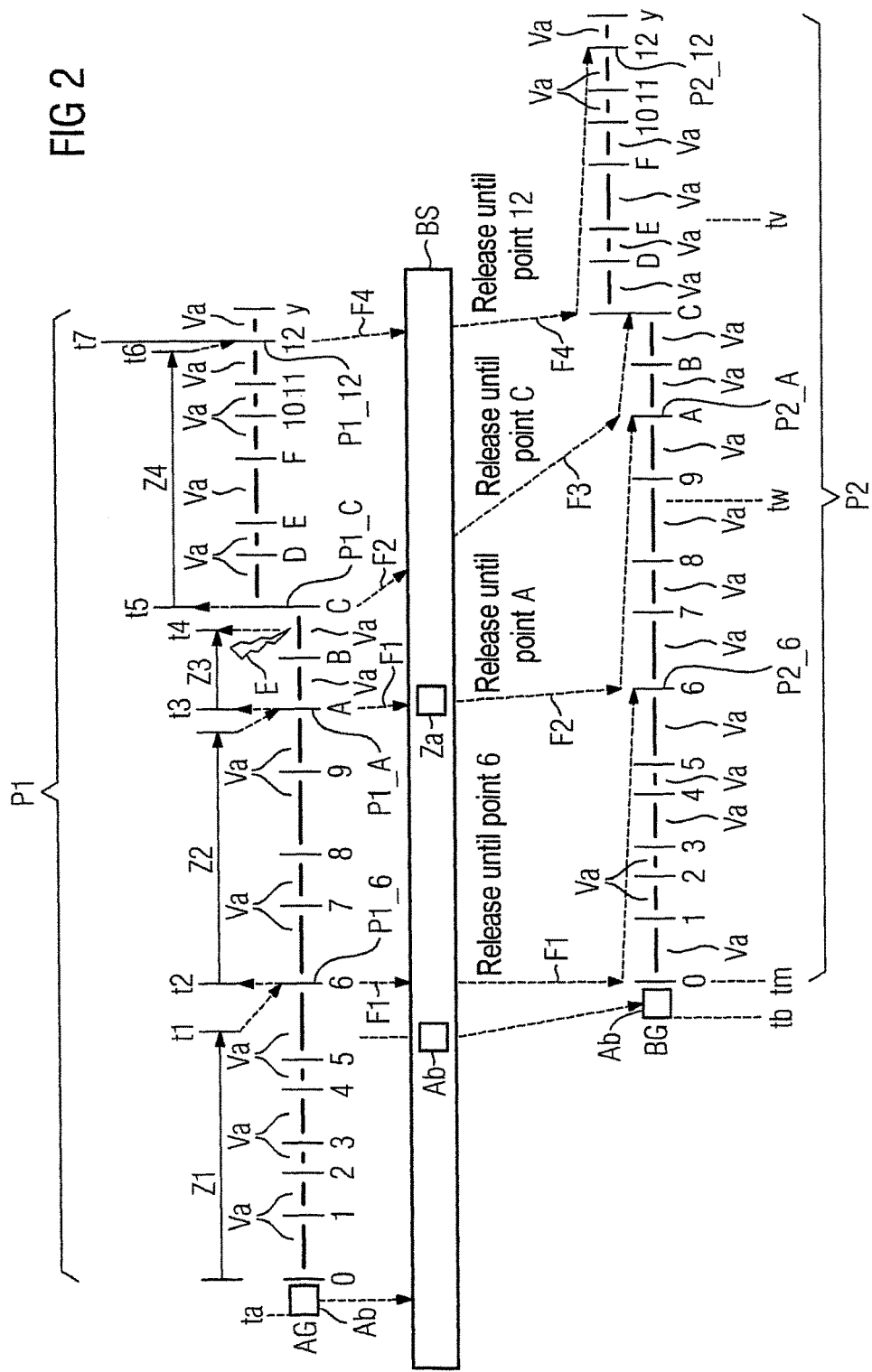
FIG. 2 shows temporally asynchronous coupling of an automation device and a backup device.

The parts which are the same in FIGS. 1 and 2 are provided with the same reference symbols.

FIG. 1 illustrates, in simplified form, parts of an automation system. This automation system is provided with an automation device AG, a backup device BG, a backup memory BS and a peripheral unit Pe that is connected to the automation device AG via a field bus Fb, where the field bus Fb complies with the PROFIBUS-DP specification, for example. In principle, other bus systems, such as Ethernet, Fieldbus, Modbus, ProfiNet IO, or else parallel bus systems, are also suitable. The peripheral unit Pe receives, via input lines Es, signals from transducers or measuring transducers, which are used to detect a process state, and outputs, via output lines As, signals to actuators that are used to influence the process. The process as well as the transducers, measuring transducers and actuators are not illustrated in the figure for the sake of clarity. The automation device AG as well as the backup device BG and the backup memory BS, which may be in the form of an independent device or may form part of the backup device BG, interchange information via a further communication connection, such as via a communication connection in the form of a global and/or a company's own network Nw.

In order to better understand the invention, temporally asynchronous coupling of an automation device to a backup device is explained in more detail below, both devices running through the same program paths in an event-synchronous manner, for example, on account of an event in the form of a process alarm. The automation device AG is provided for controlling a technical process (process control) and, for this purpose, processes a control program P1 (referred to as the automation device program below), and the backup device BG is provided for reproducing the sequence of the control program P1 in the automation device AG at predefined, predefinable or predetermined times and, for this purpose, is provided with a control program P2 (referred to as the backup program or backup device program below) which corresponds with regard to process control.

It is assumed that, from a predefined or predetermined time ta, the automation device AG creates an image Ab of its relevant data representing its internal state at this time ta. This internal state is substantially determined or predefined by static and dynamic data, data modules, process input values, process output values and configuration data. The automation device AG stores this image Ab in the backup memory BS, this image Ab stored first in the backup memory BS representing an initial image. At a time tb that may be days or months later than the time ta, for example, the backup device BG reads the image Ab from the backup memory BS, processes this image Ab and, after processing this image Ab, therefore has the same internal state as the automation device AG at the time of image creation. It should be understood that the image Ab can also be regularly transmitted at a particular interval of time during program processing using the automation device AG, but this signifies a greater burden on the automation device AG during process control.

Both programs P1, P2 have a multiplicity of processing sections Va of different duration, the programs P1, P2 being able to be interrupted at the respective beginning and the respective end of each processing section Va. The beginning and end of each processing section Va, which usually comprises a multiplicity of program codes, therefore represent interruptible program points or breakpoints 0, 1, 2, ... y. If necessary, the respective program P1, P2 can be interrupted at these points 0, 1, 2, ... y using the respective device AG, BG. The automation device AG interrupts the program P1 at these breakpoints 0, 1, 2, ... y, for example, in order to transmit releases and/or process input values to the backup memory BS and store them in this backup memory BS. After a respective predefinable or predefined interval of time Zi, i=1, 2, . . . has expired and at the respective time at which a breakpoint following the expiry of the respective interval of time Zi occurs, preferably the first breakpoint following the respective interval of time Zi, the automation device AG transmits a release or release signal and process input values (not illustrated here for the sake of clarity) to the backup memory BS, the release indicating the processing section Va up to which the automation device program P1 has processed. These processing sections Va of the backup device program P2 correspond to those which have already been processed by the automation device AG during the processing of the automation device program P1. In the present exemplary embodiment, it is assumed that, after an interval of time Z1 has expired, the automation device AG stores a release F1 in the backup memory BS at a time t1 and at a time t2 at which a first breakpoint P1_6 (breakpoint 6) follows the interval of time Z1. Within the scope of subsequent processing of this release F1 using the backup device BG at a time tm, this release F1 indicates to the backup device BG that the backup device BG can process its backup program P2 to be processed up to a breakpoint P2_6 (breakpoint 6), the breakpoint P2_6 of the backup device program P2 corresponding to the breakpoint P1_6 of the automation device program P1. This means that, based on the release F1, the backup device BG can process those processing sections Va of the backup device program P2 that correspond to the processing sections Va of the automation device program P1 up to the time at which the release F1 or the release signal is generated, in which case it is assumed in the example for the sake of simplicity that the time at which the release F1 is generated corresponds to the time at which the release F1 is transmitted to the backup memory BS. These processing sections Va are therefore processed using the backup device BG in a temporally asynchronous manner with respect to the processing of the corresponding processing sections Va using the automation device AG, the backup device BG being used to process further processing sections Va, after the processing sections Va of the backup device program P2 have been processed by the backup device BG, only when the automation device AG stores further releases and process input values in the backup memory BS and the backup device BG reads these releases and process input values from the backup memory BS and processes them.

The time at which this breakpoint P1_6 (breakpoint 6) occurs represents the beginning of an interval of time Z2 following the interval of time Z1.

The further processing of the automation device program P1 is performed in the described manner. At a time t3 at which a first breakpoint P1_A occurs after the expiry of the interval of time Z2, the automation device AG transmits a further release F2 to the backup memory BS, which release indicates that the automation device AG has processed further processing sections Va up to the breakpoint P1_A. After the backup device BG has read this release F2 from the backup memory BS, the backup device BG processes the processing sections Va of its backup device program P2 which correspond to those processing sections Va of the automation device program P1 that have been processed by the automation device AG from the time t2 to the time t3, i.e., up to the breakpoint P1_A. This means that the backup device BG processes the processing sections Va of the backup device program P2 from the time t2 of the previous release F1 to the time t3 of the current release F2. The time t3 at which the first breakpoint P1_A has occurred after the expiry of the interval of time Z2 is the beginning of an interval of time Z3 following the interval of time Z2.

An event, such as an event in the form of a process alarm, may now occur during an interval of time. In the exemplary embodiment, E is used to denote such an event to which the automation device AG must react in a suitable manner during the interval of time Z3 at a time t4 in accordance with the automation device program P1. In this case, the automation device AG does not transmit a release F3 to the backup memory BS at a time at which a breakpoint following the interval of time Z3 occurs but rather at a time t5 at which a breakpoint P1_C (breakpoint C) following the occurrence of the event E occurs. This means that the interval of time Z3 is shortened on account of the event E, the time t5 being the beginning of a following interval of time Z4. Based on the release F3 transmitted to the backup memory BS, the backup device BG processes (after the backup device BG has read this release F3) those processing sections. Va of the backup device program P2 that correspond to those processing sections Va of the automation device program P1 that have already been processed by the automation device AG between the times t3 and t5.

On account of the event E, the automation device AG processes higher-priority processing sections Va during the interval of time Z4, for example, the automation device AG implements a thread change at the time t5, and, after the interval of time Z4 has expired at the time t6, again transmits a release F4 at a time t7 at which a first breakpoint P1_12 (breakpoint 12) following the interval of time Z4 occurs. The backup device BG reads the release F4 and, based on this release F4, likewise processes processing sections Va up to a breakpoint P2_12 (breakpoint 12) in the backup device program P2, these processing sections Va corresponding to the processing sections Va of the control program P1 between the times t5 and t7, and the backup device BG likewise carrying out a thread change.

As explained, the releases and the process input values from the automation device AG make it possible for the backup device BG to run through the same "thread mountain" as the automation device AG, which means that the backup device BG implements a "thread change" at a point in the backup device program P2 corresponding to the point of the thread change in the automation device program P1. The backup device program P2 can be started at any desired time, the backup device program P2 being started with the release F1 from the point 0 using the releases F1 to F4, the process input values and the initial image Ab stored in the backup memory BS.

In order to quickly "fast-forward or rewind" the backup program P2, intermediate images are produced in addition to the initial image Ab and are stored in the backup memory BS. For example, the backup device program P2 is provided with an instruction and/or a command, on the basis of which an intermediate image Za is produced, after the backup device program P2 has been started by a user at the time tb and after the processing sections Va of the backup device program P2 have been processed up to the breakpoint P2_6 (on the basis of the release F1), and is stored in the backup memory BS. It should be understood that the backup device program P2 can be provided with a further instruction and/or a further command, as a result of which a further intermediate image is produced, after the processing sections Va of the backup device program P2 have been processed up to a further breakpoint, and is stored in the backup memory BS. This intermediate image Za represents internal states of the automation device AG in the past, to be precise at the time t3.

If a user wishes to view or analyze, for example, the progress of the automation device program P1 from a time tw, he can start the backup device program P2 taking into account the intermediate image Za, i.e., starting from the breakpoint P2_6, the backup device program P2 being processed (as described) based on the stored releases F3, F4 and the process input values.

The intermediate image Za makes it possible to view the progress of the backup device program P2 at a time tv, for example. In this case, on account of the intermediate image Za, the user also only needs to start the backup device program P2 starting from the breakpoint P2_6 which corresponds to the breakpoint P1_6, in order to view or analyze the progress of the backup device program P2 that corresponds to the progress of the automation device program P1.

It should also be understood that it is possible for the automation device AG to create such an intermediate image Za during the processing of its automation device program P1 and to store the image in the backup memory BS. In this case, it is possible to quickly "fast-forward and rewind" in the backup program P2 and therefore to also reproduce the automation device program sequence, but the automation device AG is additionally burdened during process control during the processing of the automation device program P1.

FIG. 3 is a flowchart of a method for reproducing a sequence of a program (P1) provided for process control in an automation device (AG). The method comprises providing a backup program (P2) which corresponds to the program (P1) in the automation device (AG) with regard to process control for processing using a backup device (BG), as indicated in step 310.

Next, the automation device (AG) is used to store an image (Ab) in a backup memory (BS) at at least one predefined or predefinable time during process control, as indicated in step 320. Here, the image (Ab) represents an internal state of the automation device (AG) at this time.

The automation device (AG) is now used to store releases (F1, F2, F3, F4) and process input values in the backup memory (BS) during the process control, as indicated in step 330. Here, the releases (F1, F2, F3, F4) indicate which processing sections (Va) of the program (P1) have already been processed by the automation device (AG).

The backup device (BG) is used to read the image (Ab) as well as the releases (F1, F2, F3, F4) and the process input values from the backup memory (BS), as indicated in step 340.

The backup device (BG) is now used to process processing sections (Va) of the backup program (P2), which correspond to those processing sections (Va) of the program (P1) in the automation device (AG) which have already been processed, based on the releases (F1, F2, F3, F4) and the process input values taking into account the image (Ab), as indicated in step 350.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for reproducing a sequence of a program provided for process control in an automation device, comprising:

providing a backup program which corresponds to the program in the automation device with regard to process control for processing using a backup device, the backup device processing the backup program during processing of the program in the automation device for process control;

utilizing the automation device to store an image in a backup memory within at least one predefined or predefinable time during the processing of the program in the automation device for process control, the image representing an internal state of the automation device at this time;

utilizing the automation device to store, during the processing of the program in the automation device each time a predefinable or predefined interval of time has expired or an event has occurred during the interval of time, a release and process input values in the backup memory, stored releases indicating which processing sections of the program have already been processed by the automation device and further indicating to the backup device that said backup device is permitted to process processing sections of the backup program which correspond to those processing sections of the program in the automation device which have already been processed;

utilizing the backup device to read the image as well as the stored releases and the process input values from the backup memory; and utilizing the backup device to process said processing sections of the backup program, which correspond to those processing sections of the program in the automation device which have already been processed, based on the stored releases and the process input values taking into account the stored image such that a speed at which a sequence of those processing sections of the program in the automation device which have already been processed, which sequence is to be reproduced or reconstructed, is increased.

2. The method as claimed in claim 1, wherein the backup device is utilized to process the backup program after the processing of the program in the automation device.

3. The method as claimed in claim 1, wherein the automation device is utilized to produce an initial image at a first time during the processing of the program in the automation device.

4. The method as claimed in claim 3, wherein the backup device is utilized to produce intermediate images at further times during the processing of the backup program and to store the produced intermediate images in the backup memory.

5. The method as claimed in claim 3, wherein the automation device is utilized to produce intermediate images at further times and to store the produced intermediate images in the backup memory.

6. The method as claimed in claim 1, wherein at least one of (i) the automation device, (ii) the backup device, and (iii) the backup memory are interconnected via a global network.

7. The arrangement as claimed in claim 6, wherein at least one of (i) the automation device, (ii) the backup device, and (iii) the backup memory are interconnected via a global network.

8. An arrangement comprising:

an automation device;

a backup device;

a backup memory;

a program stored in the automation device for providing process control; and a backup program which corresponds with regard to process control being provided for processing using the backup device;

wherein the automation device is configured to process the program for process control;

wherein the backup device is configured to process the backup program during the processing of the program in the automation device for process control;

wherein the automation device is further configured to store an image of its internal state in the backup memory within at least one predefined or predefinable time during process control;

wherein the automation device is further configured to store, during the processing of the program in the automation device each time a predefinable or predefined interval of time has expired or an event has occurred during the time interval, a release and process input values in the backup memory, stored releases indicating which processing sections of the program have already been processed by the automation device and further configured to indicate to the backup device that said backup device is permitted to process processing sections of the backup program which correspond to those processing sections of the program in the automation device which have already been processed;

wherein the backup device is configured to read the stored image, the stored releases and the process input values from the backup memory; and wherein the backup device is further configured to process said processing sections of its backup program, which correspond to those processing sections of the program in the automation device which have already been processed, based on the stored releases and the process input values taking into account the stored image such that a speed at which a sequence of the processing sections of the program in the automation device which have already been processed, which sequence is to be reproduced or reconstructed, is increased.

9. The arrangement as claimed in claim 8, wherein the backup device is further configured to process the backup program after the processing of the program in the automation device.

10. The arrangement as claimed in claim 8, wherein the automation device is further configured to produce an initial image at a first time during the processing of its program.

11. The arrangement as claimed in claim 10, wherein the backup device is further configured to produce intermediate images at further times during the processing of its backup program.

12. The arrangement as claimed in claim 10, wherein the automation device is further configured to produce intermediate images at further times.

13. A backup device for an arrangement including an automation device configured to store an image of its internal state in the backup memory within at least one predefined or predefinable time process control and being configured to store, during processing of a program stored in the automation device each time a predefinable or predefined interval of time has expired or an event has occurred during the time interval, a release and process input values in the backup memory, stored releases indicating which processing sections of the program have already been processed by the automation device and being further configured to provide an indication to the backup device, the program stored in the automation device providing process control, and a backup memory, the backup device comprising:

a backup program which corresponds with regard to the process control of the program in the automation device for processing for the backup device, the backup device processing the backup program during the processing of the program in the automation device for process control;

wherein the backup device is configured to read the stored image, the stored releases and the process input values from the backup memory;

wherein the backup device is further configured to receive the indication from the automation device, said indication notifying the backup device that said backup device is permitted to process processing sections of the backup program which correspond to those processing sections of the program in the automation device which have already been processed; and wherein the backup device is further configured to process said processing sections of its backup program, which correspond to those processing sections of the program in the automation device which have already been processed, based on the stored releases and the process input values taking into account the stored image such that a speed at which a sequence of the processing sections of the program in the automation device which have already been processed, which sequence is to be reproduced or reconstructed, is increased.

14. The backup device as claimed in claim 13, wherein the backup device is further configured to process the backup program after the processing of the program in the automation device.

15. The backup device as claimed in claim 13, wherein the backup device is further configured to produce the intermediate images at the further times during the processing of the backup program and to store them in the backup memory.

16. An automation device for an arrangement including a backup device configured to read an image, releases and process input values from a backup memory and configured to process processing sections of its backup program, which correspond to those processing sections of the program in the automation device which have already been processed, based on the releases and the process input values taking into account a stored image, the backup memory, and a backup program which corresponds with regard to process control being provided for processing using the backup device, the automation device comprising:

a program stored in the automation device for process control;

wherein the automation device is configured to process the program for process control;

wherein the automation device is further configured to store an image of its internal state in the backup memory during at least one predefined or predefinable time during process control; and wherein the automation device is further configured to store, during processing of the program in the automation device each time a predefinable or predefined interval of time has expired or an event has occurred during the time interval, a release and the process input values in the backup memory, stored releases indicating which processing sections of the program have already been processed by the automation device, and further configured to indicate to the backup device that said backup device is permitted to process processing sections of the backup program which correspond to those processing sections of the back program in the automation device which have already been processed such that a speed at which a sequence of the processing sections of the program in the automation device which have already been processed, which sequence is to be reproduced or reconstructed, is increased.

17. The automation device as claimed in claim 16, wherein the automation device is further configured to produce the initial image at the first time during the processing of its program.

18. The automation device as claimed in claim 17, wherein the automation device is further configured to produce the intermediate images at the further times during the processing of its program.

* * * * *